(12) United States Patent
Ferrara et al.

(10) Patent No.: US 11,789,724 B2
(45) Date of Patent: Oct. 17, 2023

(54) MACHINE LEARNING TO FACILITATE INCREMENTAL STATIC PROGRAM ANALYSIS

(71) Applicant: International Business Machines Corporation, Armonk, NY (US)

(72) Inventors: Pietro Ferrara, White Plains, NY (US); Marco Pistoia, Amawalk, NY (US); Pascal Roos, Zurich (CH); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1495 days.

(21) Appl. No.: 15/244,229

(22) Filed: Aug. 23, 2016

(65) Prior Publication Data

US 2018/0060068 A1 Mar. 1, 2018

(51) Int. Cl.
*G06N 20/00* (2019.01)
*G06F 8/75* (2018.01)
*G06F 8/65* (2018.01)

(52) U.S. Cl.
CPC .................. *G06F 8/75* (2013.01); *G06F 8/65* (2013.01); *G06N 20/00* (2019.01)

(58) Field of Classification Search
CPC ........... H04J 1/00; G06N 20/00; G06N 5/025; G06N 7/005; G06K 9/6256; G06K 9/6269

(Continued)

(56) References Cited

U.S. PATENT DOCUMENTS 5,204,960 A 4/1993 Smith et al.
6,671,876 B1 12/2003 Podowski
(Continued)

FOREIGN PATENT DOCUMENTS

CN 104503917 A 4/2015

OTHER PUBLICATIONS

Gong et al.—"Classifying Windows Malware with Static Analysis"—May 26, 2016—https://www.semanticscholar.org/paper/Classifying-Windows-Malware-with-Static-Analysis-Gong-Girkar/9db2b4eb52789f5e48d6f73c01689c54197f37cf#citing-papers (Year: 2016).*

(Continued)

*Primary Examiner* — Viker A Lamardo
(74) *Attorney, Agent, or Firm* — Amin, Turocy & Watson, LLP

(57) ABSTRACT

Techniques for facilitating incremental static program analysis based on machine learning techniques are provided. In one example, a system comprises a feature component that, in response to an update to a computer program, generates feature vector data representing the update, wherein the feature vector data comprises feature data representing a feature of the update derived from an abstract state of the computer program, and wherein the abstract state is based on a mathematical model of the computer program that is generated in response to static program analysis of the computer program. The system can further comprise a machine learning component that employs a classifier algorithm to identify an affected portion of the mathematical model that is affected by the update. The system can further comprise an incremental analysis component that incrementally applies the static program analysis to the computer program based on the affected portion.

18 Claims, 10 Drawing Sheets

(58) Field of Classification Search
USPC .......................................................... 706/12
See application file for complete search history.

(56) References Cited

U.S. PATENT DOCUMENTS

| | | | |
|---|---|---|---|
| 6,820,253 B1 | 11/2004 | Robison | |
| 7,926,039 B2 | 4/2011 | Wang et al. | |
| 8,726,254 B2 | 5/2014 | Rohde et al. | |
| 8,806,450 B1 | 8/2014 | Maharana et al. | |
| 8,813,033 B2* | 8/2014 | Sreedhar | G06F 11/3608 717/124 |
| 8,850,589 B2* | 9/2014 | Pistoia | G06F 21/577 726/25 |
| 2011/0083124 A1 | 4/2011 | Moskal et al. | |
| 2012/0054724 A1* | 3/2012 | Kalman | G06F 11/3604 717/131 |
| 2014/0130154 A1* | 5/2014 | Dolby | H04L 63/1408 726/22 |
| 2017/0270424 A1* | 9/2017 | Sankaralingam | G06F 8/42 |

OTHER PUBLICATIONS

Tripp et al.—"ALETHEIA: Improving the Usability of Static Security Analysis"—2014—https://dl.acm.org/doi/10.1145/2660267.2660339 (Year: 2014).*

Wilson et al.—"Efficient context-sensitive pointer analysis for C programs"—1995—https://dl.acm.org/doi/10.1145/223428.207111 (Year: 1995).*

Conti et al.—"Losing Control: On the Effectiveness of Control-Flow Integrity under Stack Attacks"—2015—https://dl.acm.org/doi/10.1145/2810103.2813671 (Year: 2015).*

Mell, P., et al., "The NIST Definition of Cloud Computing," National Institute of Standards and Technology, Sep. 2011, 7 pages, Special Publication 800-145, U.S Department of Commerce.

Tripp, O., et al., "Andromeda: Accurate and Scalable Security Analysis of Web Applications," Lecture Notes in Computer Science, Fundamental Approaches to Software Engineering, 2013, pp. 210-225.

* cited by examiner

MACHINE LEARNING TO FACILITATE INCREMENTAL STATIC PROGRAM ANALYSIS

BACKGROUND

The subject disclosure relates to computer program analysis, and more specifically, to machine learning to facilitate incremental static program analysis.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate machine learning to facilitate incremental static program analysis.

According to an embodiment, a system is provided. The system can comprise a memory that stores computer executable components and a processor that executes computer executable components stored in the memory. The computer executable components can comprise a feature component that, in response to an update to a computer program, generates feature vector data representing the update. The feature vector data can comprise feature data representing a feature of the update derived from an abstract state of the computer program. The abstract state can be based on a mathematical model of the computer program that is generated in response to static program analysis of the computer program. The system can further comprise a machine learning component that can employ a classifier algorithm to identify an affected portion of the mathematical model that is affected by the update. The system can further comprise an incremental analysis component that can incrementally applies the static program analysis to the computer program based on the affected portion In some embodiments, elements described in connection with the system can be embodied in different forms such as a computer-implemented method, a computer program product, or another form.

DETAILED DESCRIPTION

Figure 1:
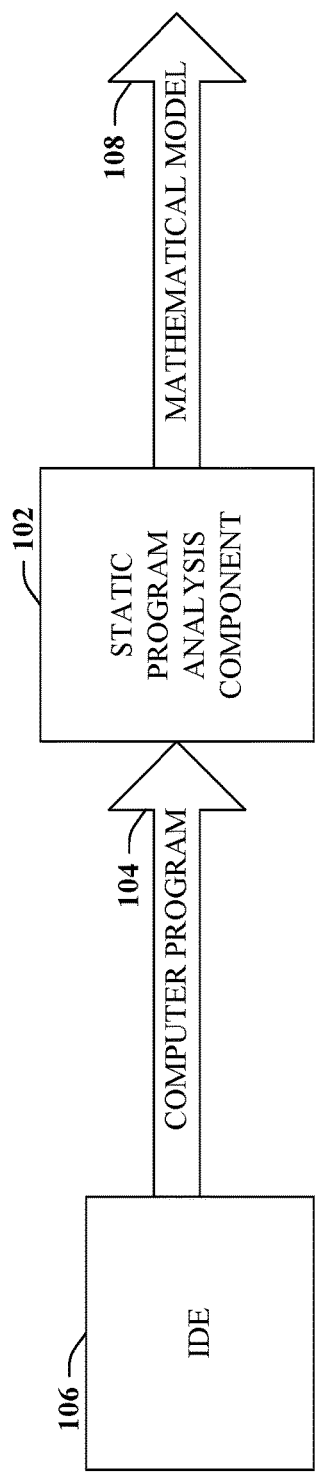
FIG. 1 illustrates a block diagram of an example, non-limiting system that utilizes static program analysis to generate a mathematical model of a computer program in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Program analysis can be employed to identify potential bugs, such as coding errors, security vulnerabilities, or the like. Program analysis applications typically output a set of warnings that provide a description and other details of the potential error, security vulnerability, etc.

Program analysis can be broadly categorized as either dynamic program analysis or static program analysis. For example, dynamic program analysis is typically fast and scales well to large programs (e.g., industry-scale software systems) but usually operates during execution of the computer program in order to function and also usually requires access to source code. Hence, dynamic program analysis generally calls for the program to be installed, which consumes resources (e.g., time, memory, processing, etc.) and executed, which can expose the analysis system to security threats. Since dynamic program analysis functions during execution of the computer program being analyzed, a full analysis calls for every code segment to be executed, which is generally infeasible, if not impossible. For example, every code branch, every possible input, or other possible permutations may be infinite or too numerous to test. Thus, dynamic program analysis generally may not be able to discover all potential errors, vulnerabilities, or other issues.

In various embodiments described herein, static program analysis is employed, which represents a form of program analysis that is distinct from dynamic program analysis. One or more embodiments of static program analysis can differ from dynamic program analysis in a number of ways. For instance, static program analysis does not require the program being analyzed to be installed or executed. Thus, one or more embodiments of static program analysis can provide benefits in terms of resource consumption and risk exposure. Moreover, static program analysis can operate on source code or object code, which can be useful for analysis of libraries or other program elements for which the associated source code is not available. In some embodiments, static program analysis can take longer to complete and may not scale as well to large programs compared to dynamic program analysis. However, one or more embodiments of static program analysis can have a greater likelihood of identifying potential errors, vulnerabilities, or other issues.

Static program analysis typically operates by examining computer program statements and/or instructions in order to build a mathematical model for the computer program. The model can be used to infer properties of the computer program. While use of the model can identify potential errors, static program analysis can suffer from different forms of imprecision in some embodiments. For example, in order to handle industry-scale applications, static program analysis can apply aggressive approximations in some embodiments. Notable dimensions of precision loss can include: flow insensitivity (where the analysis does not track the order in which memory updates occur and instead conservatively accounts for possible update orders); path insensitivity (where the analysis ignores path conditions, thereby traversing infeasible execution paths); and context insensitivity (where the analysis can forgo modeling the calling context of a method, thereby analyzing infeasible invocation scenarios).

These and other sources of inaccuracy can shrink the analysis' state space (also known as the abstract state) by an exponential factor, and hence provide a significant contribution to the scalability of the analysis. As an example, if path conditions are accounted for, then the analysis typically has to track two different runtime program states when reaching a branching condition. Path insensitivity can save the analysis from this type of state-space blowup, but at the cost of using approximations that are conservatively applied to account for all possibilities. In other words, in some embodiments, without using approximations, the state-space can grow so large as to be incapable of being stored in memory, particularly with industry-scale software. Using approximations such as those detailed above can mitigate the growth of the state-space, allowing for scalability for static program analysis.

The approximations can be conservative in nature so that all (or one or more) possible states are ultimately accounted for and, unlike with dynamic program analysis, applied such that no false negatives (e.g., errors or vulnerabilities not detected) will exist. In other words, static program analysis can discover substantially all potential errors or vulnerabilities, whereas dynamic program analysis is extremely likely to fail to discover numerous potential errors or vulnerabilities.

Hence, static program analysis has many applications in software refactoring, testing, verification, and comprehension. Such can enable automated reasoning at a large scale, covering complex behaviors of the software system, including, e.g., behaviors involving third-party libraries for which the source code is not available. Unfortunately, advantages of static program analysis (e.g., vis-à-vis dynamic program analysis) come at a price in terms of computation time. For instance, an industry-scale computer program may require a significant amount of time for other static program analysis tools to analysis, e.g., on the order of hours, in some cases 24 hours or more.

At the same time, developers that use such tools to discover errors or vulnerabilities typically need to update the code of the computer program in order to remove or mitigate the error or vulnerability that was detected by the analysis tool. However, even a change of a single line of code local to one method of the computer program may have dramatic global effects on the computer program and may even introduce or surface a new error or vulnerability. Repeating a lengthy static program analysis (e.g., hours of computation time) to determine how a small update affects a computer program is generally deemed to be infeasible and results in static program analysis being disfavored in some segments of the market place.

Embodiments of the disclosed subject matter can improve the usability of static program analysis tools. For example, in some embodiments, the disclosed subject matter can provide for incremental static program analysis, which can also be referred to as "incremental program analysis." As used herein, incremental static program analysis is intended to represent elements or techniques that incrementally update a mathematical model or other representation or result of static program analysis to reflect updates to the computer program that occur after the mathematical model of the computer program has been generated. In some embodiments, an advantage of incremental program analysis can be that the entire computer program does not need to be re-analyzed because of an update. In some embodiments, incremental program analysis can provide analysis in significantly less time than for static program analysis to analyze the computer program from scratch (e.g., on the order of seconds or less versus hours). In some embodiments, incremental program analysis can improve the usability of static program analysis-based tools in the market.

As noted, even a small change to a method (e.g., a change local to the method) of the computer program can have global effects. Such global effects can result from two types of computer program updates referred to herein as "method call resolution" and "heap memory access." For method call resolution, a change to the code at a given location can have an effect on other locations, including affecting other methods of the computer program. For example, such effects can occur if the update changes the identity of a receiver for a method call or some other value that transitively influences the receiver of a downstream or subsequently called method. The analysis therefore can re-compute, either in part or in full, a points-to-solution for every pointer or reference variable (or, in some embodiments, one or more pointers or reference variables) in the code, which can include object fields. For accesses to heap memory, analogous considerations to those specified for method call resolution can exist, but in this case in the context of the computer program's heap memory model. For instance, if a given value has changed, then that change may influence heap memory read and write accesses in downstream computations that are outside the boundaries of the current method.

Incremental program analysis is considered a hard problem with no viable solution prior to this disclosure. In some embodiments, the disclosed subject matter can provide for two forms of global reasoning to account properly for code changes to a computer program that relate to method call resolution and heap memory accesses.

In this regard, disclosed incremental program analysis techniques can encode certain context information of updates to the computer program as machine-learnable features. These features can be provided to a classifier that determines which behaviors should be accepted. In other words, the classifier is trained to identify which portions of a mathematical model generated via static program analysis should be invalidated based on updates and/or which portions of the mathematical model are still valid. The classifier can be trained in advance based on other computer programs and/or changes associated with those other computer programs.

Turning now to the drawings, FIG. 1 illustrates a block diagram of an example, non-limiting system 100 that utilizes static program analysis to generate a mathematical model of a computer program in accordance with one or more embodiments of the disclosed subject matter. System 100 and/or the components of the system 100 or other systems disclosed herein can be employed to use hardware and/or software to solve problems that are highly technical in nature, that are not abstract, and that cannot be performed as a set of mental acts by a human. Further, some of the processes performed can be performed by specialized computers for carrying out defined tasks related to static program analysis, incremental program analysis, and/or machine learning techniques. System 100 and/or components of system 100 or other systems described herein can be employed to solve new problems that arise through advancements in technology, computer networks, the Internet, and the like. System 100 or other systems detailed herein can provide technical improvements to static program analysis in general, and more specifically can provide a useful and feasible implementation of incremental static program analysis in some embodiments.

System 100 can comprise a processor and a memory that stores executable instructions that, when executed by the processor, facilitate performance of operations. Examples of said processor and memory, as well as other suitable computer or computing-based elements, can be found with reference to FIG. 10, and can be used in connection with implementing one or more of the systems or components shown and described in connection with FIG. 1 or other figures disclosed herein.

In this example, system 100 can include static program analysis component 102. Static program analysis component 102 can receive computer program 104. In some embodiments, computer program 104 can be received from an integrated development environment (IDE) 106 or another suitable programming tool or editor. In some embodiments, computer program 104 can comprise data representing source code. In some embodiments, computer program 104 can comprise data representing binary code or object code. Computer program 104 can comprise a method that, if executed, can cause computer program 104 to be in a specific state that can be represented as a snapshot of heap memory and a snapshot of a stack.

Static program analysis component 102 can apply static program analysis to computer program 104 to generate mathematical model 108. Mathematical model 108 can represent a conservative estimation of behavior of a method in isolation and under worst-case assumptions, and similar for all methods of computer program 104. Mathematical model 108 can describe an abstract state that can represent all potential or possible states (or, in some embodiments, one or more potential or possible states) of computer program 104. A conservative estimation of behavior of a method under worst-case assumptions can refer to identifying all (or, in some embodiments, one or more) logically available paths of execution that can exist for computer program 104 even if those execution paths are not possible or feasible during actual execution of computer program 104. Thus, abstract state represents a superset of all (or, in some embodiments, one or more) possible states (e.g., state) computer program 104 can be in during execution. In this regard, in some embodiments, mathematical model 108, generated according to static program analysis, can be employed to identify all (or, in some embodiments, one or more) potential errors or vulnerabilities (e.g., no false negatives), and may identify potential errors or vulnerabilities that result from a state that is not possible or feasible during execution computer program 104 (e.g., false positives).

Figure 2:
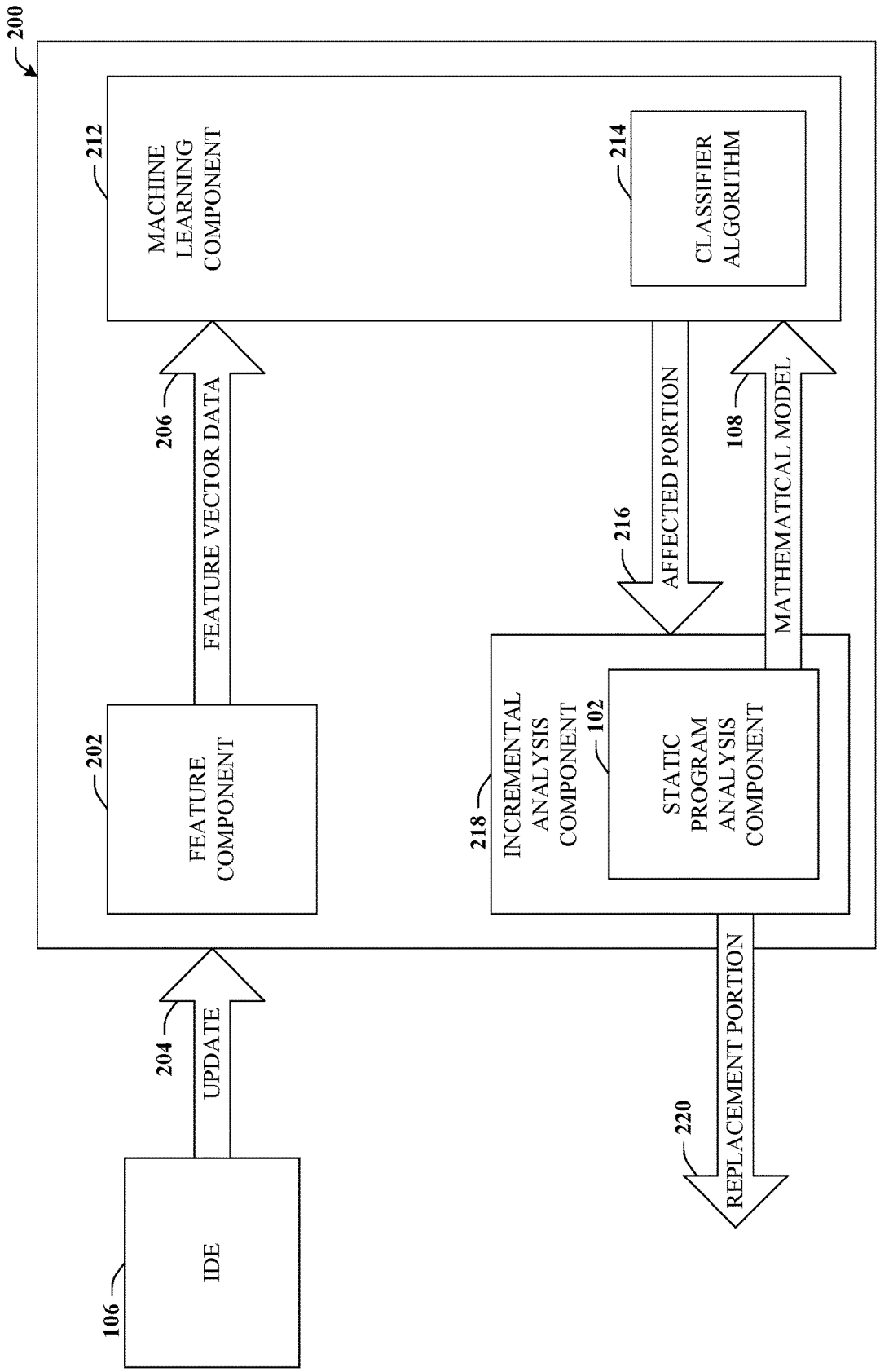
FIG. 2 illustrates a block diagram of an example, non-limiting system that can facilitate incremental static program analysis based on machine learning techniques in accordance with one or more embodiments described herein.

Referring now to FIG. 2, system 200 is depicted. System 200 illustrates a block diagram of a non-limiting example of a system that can facilitate incremental static program analysis based on machine learning techniques in accordance with certain embodiments of the disclosed subject matter. Repetitive description of like elements employed in other embodiments described herein is omitted for sake of brevity. In some embodiments, incremental static program analysis can provide an incremental update to mathematical model 108 in response to changes to computer program 104, which can significantly reduce computation time versus re-computing a new model from scratch.

System 200 can comprise feature component 202 that can receive update 204. Update 204 can represent a change or update to computer program 104. For example, computer program 104 may be updated to remove or mitigate an error or vulnerability that was detected by the static program analysis or another means, re-factored to incorporate a new program element, or the like. Update 204 can be minor in nature, e.g., resulting from changes to a single line of code or more extensive. In some embodiments, update 204 can be received from integrated development environment (IDE) 106, another suitable programming tool, an editor, or similar. In some embodiments, all or portions of system 200 or other components or elements detailed herein can be included in IDE 106 or another suitable programming tool.

In response to update 204 to computer program 104, feature component 202 can generate feature vector data 206. Feature vector data 206 can mathematically represent update 204. In some embodiments, feature vector data 206 can comprise feature data 208 at a defined offset within feature vector data 206. Feature data 208 can represent a feature 210 of update 204 that can be derived from abstract state. In other words, feature component 202 can identify and logically abstract certain defined characteristics or elements of update 204 as features (e.g., feature 210), which can be combined into feature vector data 206 and provided to machine learning component 212.

Machine learning component 212 can receive mathematical model 108, e.g., from static program analysis component 102. Machine learning component 212 can receive feature vector data 206 and can employ classifier algorithm 214 (or another suitable classifier or machine learning technique) to identify affected portion 216. Affected portion 216 can represent a subset of mathematical model 108 that is affected by update 204. In some embodiments, classifier algorithm 214 and/or machine learning component 212 can mark or tag affected portion 216 as invalid. Said differently, affected portion 216 can represent a portion of mathematical model 108 that is no longer valid due to update 204 and, hence, can be incrementally re-computed.

It is understood that classifier algorithm 214 can be trained in advance according to machine learning techniques, which is further detailed in connection with FIGS. 5 and 6. Based on such training, classifier algorithm 214 can learn how a particular feature (e.g., feature 210) affects mathematical model 108 and/or how to account for feature 210 in the context of mathematical model 108. By extension, such can be used for determining how update 204 can be accounted for to incrementally change mathematical model

108 without completely generating a new mathematical model. In some embodiments, machine learning component 212 can identify affected portion 216 based on feature vector data 206.

In this regard, incremental analysis component 218 can receive affected portion 216 or related information. Incremental analysis component 218 can incrementally apply static program analysis to computer program 104 based on affected portion 216. For example, incremental analysis component 218 can employ static program analysis on a subset of computer program 104 and that subset can be determined by machine learning techniques (e.g., classifier algorithm 214) and represented by affected portion 216. In other words, based on machine learning, in some embodiments, incremental analysis component 218 can identify the extent of updates to mathematical model 108 and how such updates are provided.

In some embodiments, incremental analysis component 218 can generate replacement portion 220. Replacement portion 220 can represent a newly generated model portion for mathematical model 108 that can be employed to replace affected portion 216. It is understood that such can facilitate usability of incremental static program analysis in some embodiments. For example, computation times as a result of updates (e.g., update 204) can be reduced, which, in some embodiments, can enable static program analysis to be a viable option for developers of industry-scale software systems. By applying static program analysis incrementally (e.g., incremental program analysis) rather than fully analyzing the updated program according to static program analysis, feedback with respect to the analysis can be provided in substantially real-time (e.g., a few second or less) rather than the amount of time normally associated with static program analysis to generate a complete model.

In some embodiments, classifier algorithm 214 can be trained according to machine learning techniques to learn global effects of various features such as feature 210. As was described, these features that are abstracted from update 204 can be derived from abstract state before any global events occur. In this context, and based on the discussion herein, global events can be categorized as relating to method calls and heap accesses. Examples of feature 210 with respect to method calls can be found with reference to FIG. 3. Examples of feature 210 with respect to heap accesses can be found with reference to FIG. 4.

Figure 3:
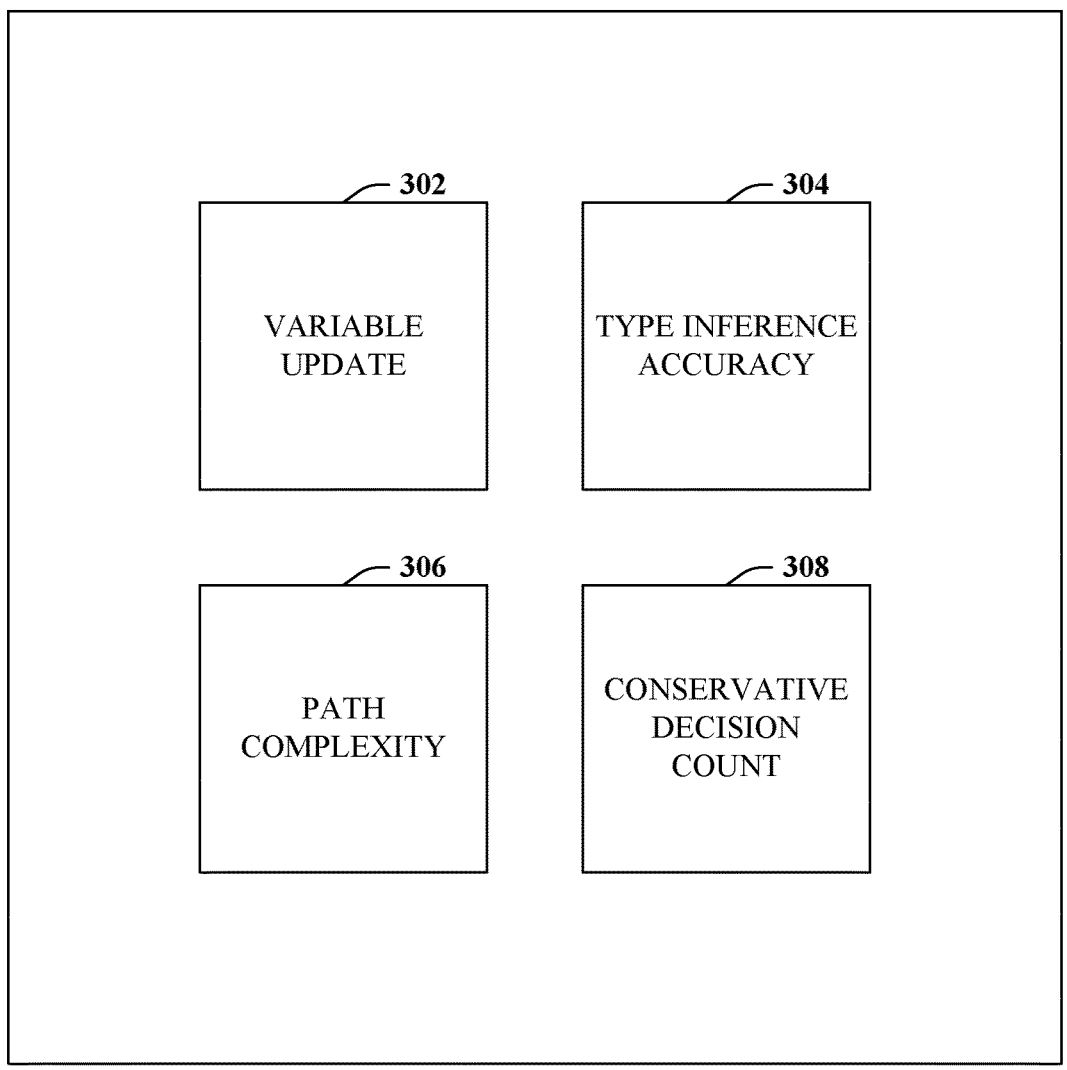
FIG. 3 illustrates a block diagram of non-limiting examples of heap access features of the feature vector data in accordance with one or more embodiments of the disclosed subject matter.

FIG. 3 illustrates a block diagram of non-limiting examples of heap access features (e.g., feature 210) of the feature vector data 206 in accordance with one or more embodiments of the disclosed subject matter. Repetitive description of like elements employed in other embodiments described herein is omitted for sake of brevity.

For instance, in the context of heap accesses that are represented by update 204, feature 210 can relate to variable update 302. Variable update 302 can relate to substantially any update to an involved variable or field inside method where changes occur (e.g., a method of computer program 104). As another example, feature 210 can relate to type inference accuracy 304. In some embodiments, a type inference can relate to an automatic deduction of a data type of an expression in computer program 104. An accuracy of such deductions can be reflected by type inference accuracy 304.

Figure 4:
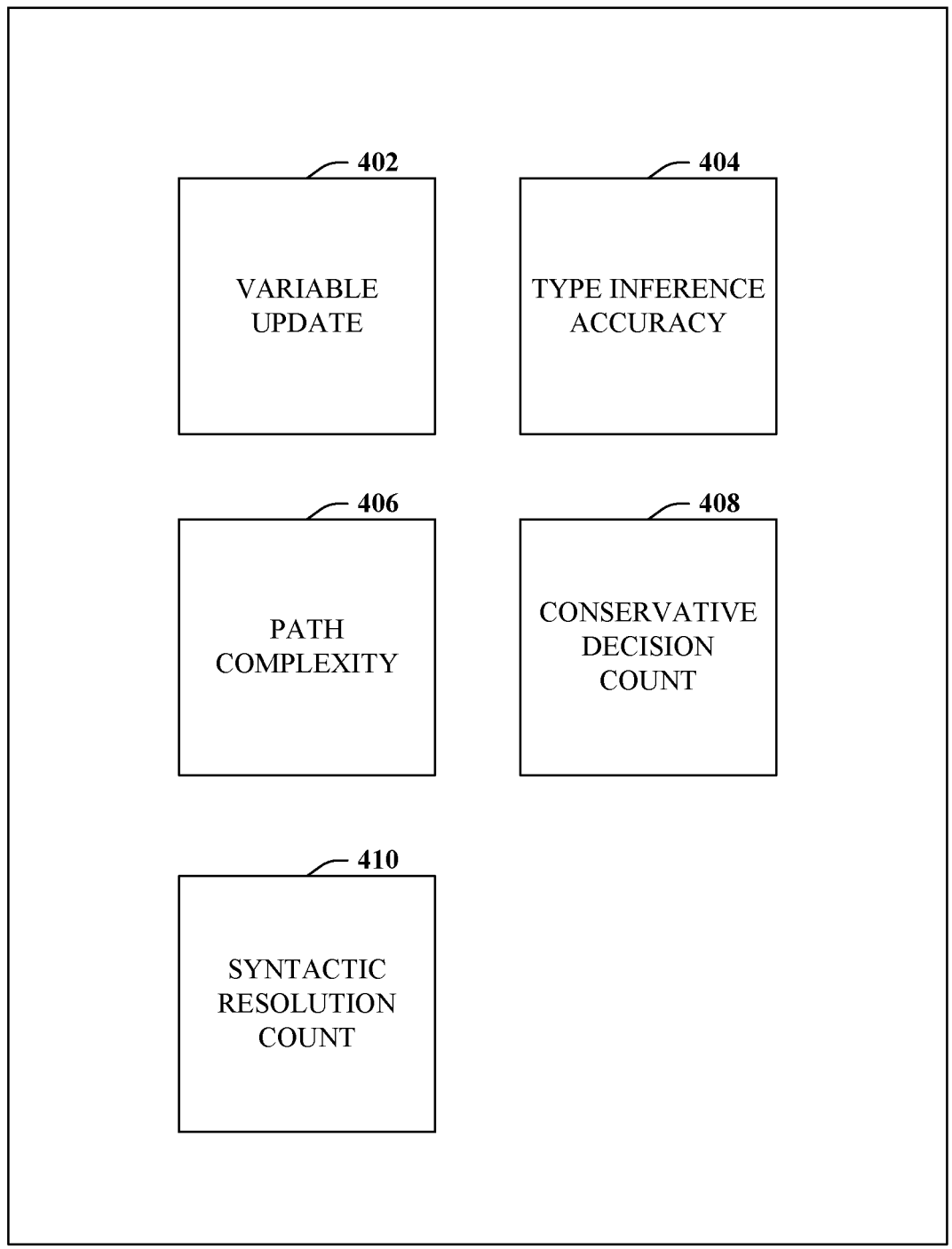
FIG. 4 illustrates a block diagram of non-limiting examples of method call features of feature vector data in accordance with one or more embodiments of the disclosed subject matter.

As another example, feature 210 can relate to path complexity 306. Path complexity 306 can relate to a complexity of a path or paths that can lead to the heap access. In some embodiments, path complexity 306 can relate to a complexity of a path by which a particular heap access statement can be reached based on abstract state. As still another example, feature 210 can relate to conservative decision count 308. Conservative decision count 308 can relate to a number or degree of conservative decisions influencing a given point. Conservative decisions can be based on abstract state FIG. 4 illustrates a block diagram of non-limiting examples of method call features (e.g., feature 210) of feature vector data 206 in accordance with one or more embodiments of the disclosed subject matter. Repetitive description of like elements employed in other embodiments described herein is omitted for sake of brevity.

For instance, in the context of method calls that are represented by update 204, feature 210 can relate to variable update 402. Variable update 402 can relate to substantially any update to a receiver variable. A receiver variable can relate to a variable received by the method being called. As another example, feature 210 can relate to type inference accuracy 404. In some embodiments, a type inference can relate to an automatic deduction of a data type of an expression in computer program 104. An accuracy of such deductions can be reflected by type inference accuracy 404.

As another example, feature 210 can relate to path complexity 406. Path complexity 406 can relate to a complexity of a path or paths that can lead to the method call. In some embodiments, path complexity 406 can relate to a complexity of a path by which a particular call can be reached based on abstract state. As still another example, feature 210 can relate to conservative decision count 308. Conservative decision count 408 can relate to a number or degree of conservative decisions influencing a given point. Conservative decisions can be based on abstract state. Another example of feature 210 can relate to syntactic resolution count 410. Syntactic resolution count 410 can relate to a number of syntactic resolutions that occur.

Figure 5:
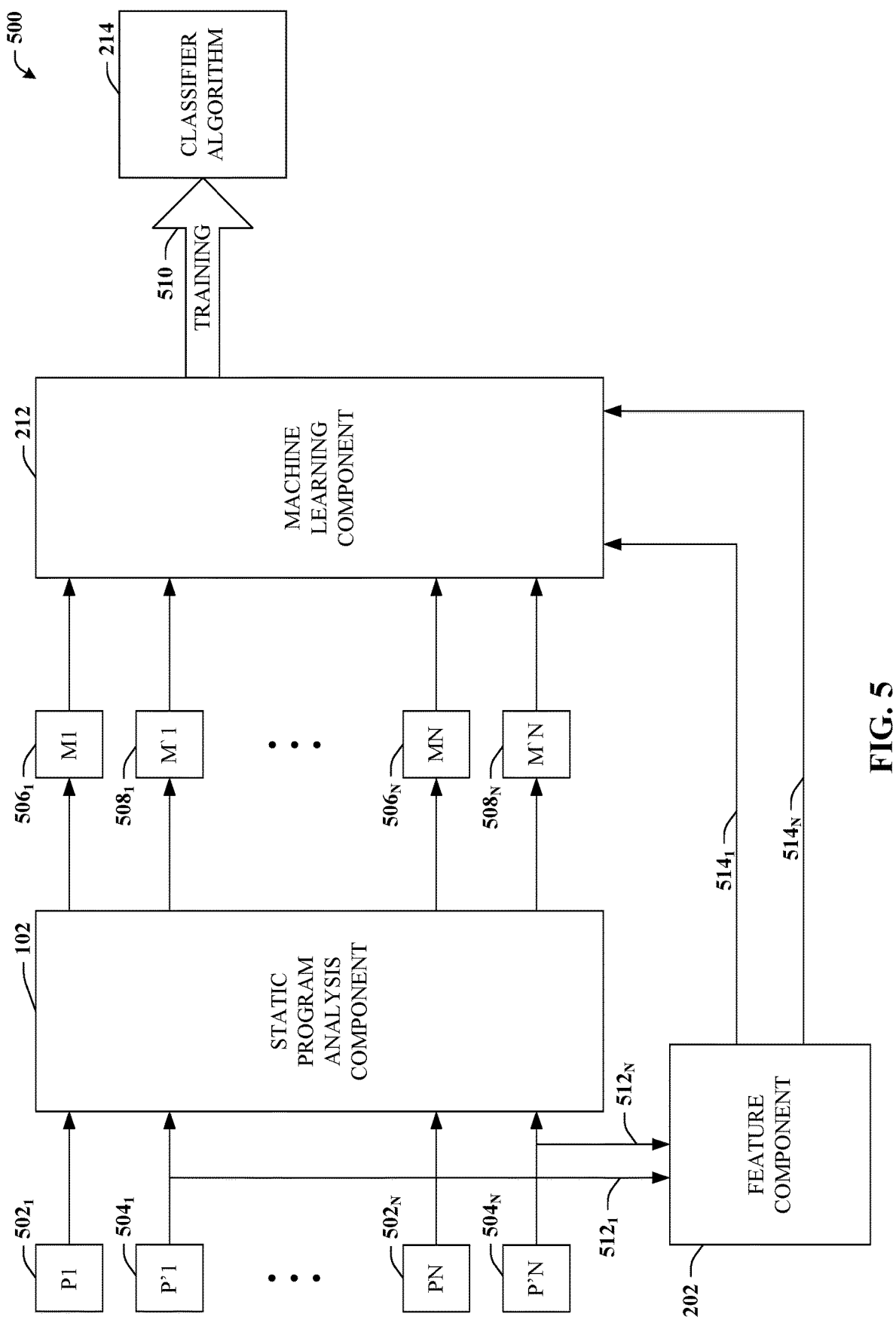
FIG. 5 illustrates a block diagram of an example, non-limiting system that illustrates machine learning-based training of classifier algorithm in accordance with one or more embodiments of the disclosed subject matter.

Turning now to FIG. 5, system 500 is depicted. System 500 illustrates a non-limiting example of machine learning-based training of classifier algorithm 214 in accordance with one or more embodiments of the disclosed subject matter. Repetitive description of like elements employed in other embodiments described herein is omitted for sake of brevity.

System 500 can comprise static program analysis component 102 and machine learning component 212 as substantially described herein. Static program analysis component 102 can receive some number, N, computer programs labeled P1 through PN and denoted programs $502_1$-$502_N$, where N can be substantially any positive integer. Static program analysis component 102 can also receive updated computer programs labeled P'1 through P'N and denoted updated programs $504_1$-$504_N$. For example, P'1 can represent P1 that has been updated in some way, for instance in accordance with changes that can be reflected by update 204, which are here denoted updates $512_1$-$512_N$. Elements labeled herein with subscripts can be referred to, either individually or collectively without use of the subscript for brevity. Hence, appropriate subscripts are generally employed only when instructive or convenient to highlight various distinctions or to better impart the disclosed concepts.

Updates 512 can be provided to feature component 202 that can generate corresponding feature vector data $514_1$-$514_N$ similar to that described in connection with feature vector data 206. Feature vector data 514 can be provided to machine learning component 212.

Static program analysis component 102 can generate, according to static program analysis discussed herein, mathematical models of the corresponding program (e.g., programs $502_1$-$502_N$) or the corresponding updated program (e.g., updated programs $504_1$-$504_N$). For programs 502, such models are labeled herein as M1 through MN and denoted models $506_1$-$506_N$. For updated programs 504, such models are labeled herein as M'1 through M'N and denoted models $508_1$-$508_N$. In some embodiments, models 508 can be generate from scratch based on updated program 504. In other words, rather than applying incremental program analysis described here, the entire updated program 504.

Machine learning component 212 can thus compare M1 with M'1 to identify how the model changed based on (the specific) update $512_1$. Such can be analyzed in view of feature vector data $514_1$ to identify how the particular features of feature vector data $514_1$ affect M'1 relative to M1. In response, machine learning component 212 can train classifier algorithm 214 accordingly, which is denoted as training 510. Said differently, machine learning component 212 can identify how models (e.g., M1, MN, etc.) change relative to certain updates 512 and by proxy how those models will change according to certain features that are derived from updates 512 by feature component 202. As one result, in some embodiments, classifier algorithm 214 can be trained to learn the appropriate portions of a computer program that change based on the features of the change. Examples of such training 510 can be found in connection with FIG. 6.

Figure 6:
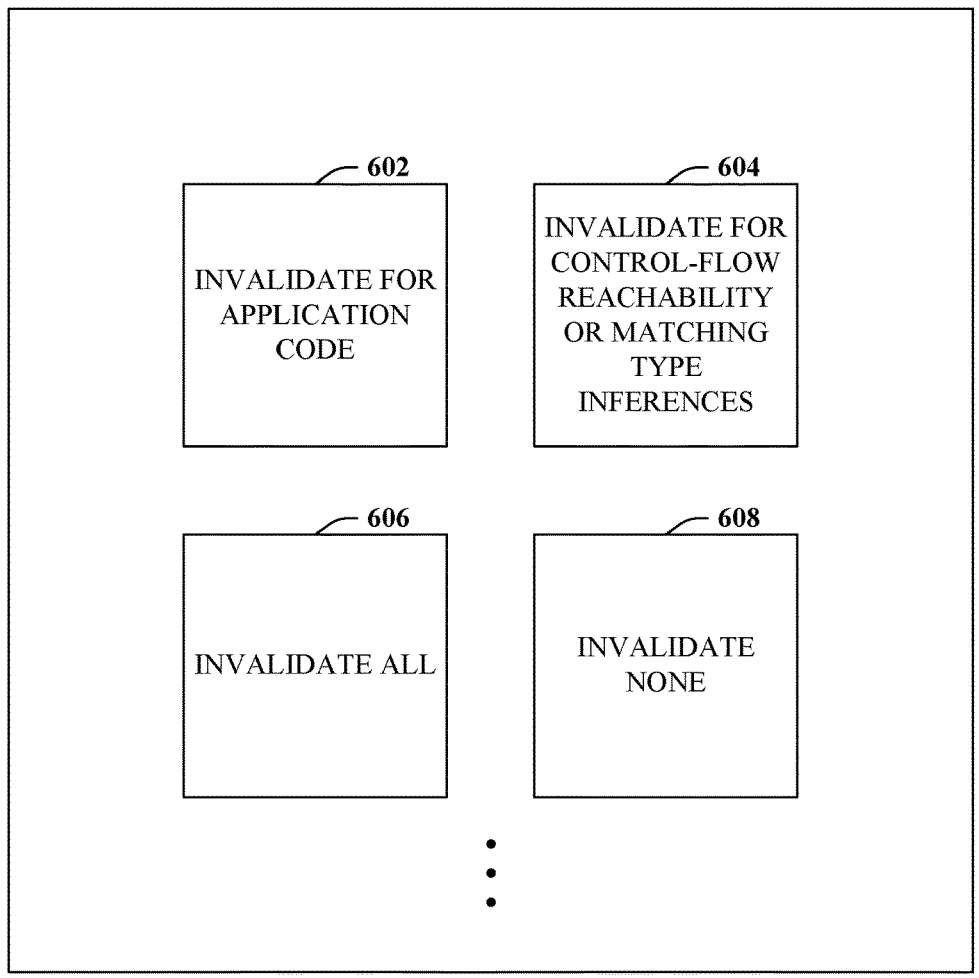
FIG. 6 illustrates a block diagram of non-limiting examples of learned behavior for the classifier algorithm in response to the training in accordance with one or more embodiments of the disclosed subject matter.

With reference now to FIG. 6, graphical illustration 600 is provided. Graphical illustration 600 depicts a block diagram of non-limiting examples of learned behavior for the classifier algorithm 214 in response to training 510 in accordance with certain embodiments of the disclosed subject matter. Repetitive description of like elements employed in other embodiments described herein is omitted for sake of brevity.

Based on training 510, machine learning component 212 can train classifier algorithm 214 to respond to certain features (e.g., feature 210) according to various learned behavior. Such can represent machine learning techniques to learn global effects of feature 210 (and by proxy global effects of update 204). For example, such learned behavior can be to invalidate for application code 602. Such can relate to propagating data to field reads (e.g., for heap accesses) or resolving to targets (e.g., for method calls) only in application code. Hence, such operations need not be extended to non-application code such as libraries, which in some embodiments, can be a significant proportion of the total amount of code that is involved.

Another example of learned behavior can be to invalidate for control-flow reachability or matching type inferences 604. Such can relate to propagating data only to field reads that have control-flow reachability to write access (e.g., for heap accesses) or to resolving only to targets matching a type inference result (e.g., for method calls). Still another example of learned behavior can be to invalidate all 606. Such can relate to propagating data to all field reads (e.g., for heap accesses) or resolving to all targets (e.g., for method calls). Another example of learned behavior can be to invalidate none 608. Such can relate to refraining from propagating data (e.g., for heap accesses) or resolving to no targets (e.g., for method calls).

Figure 7:
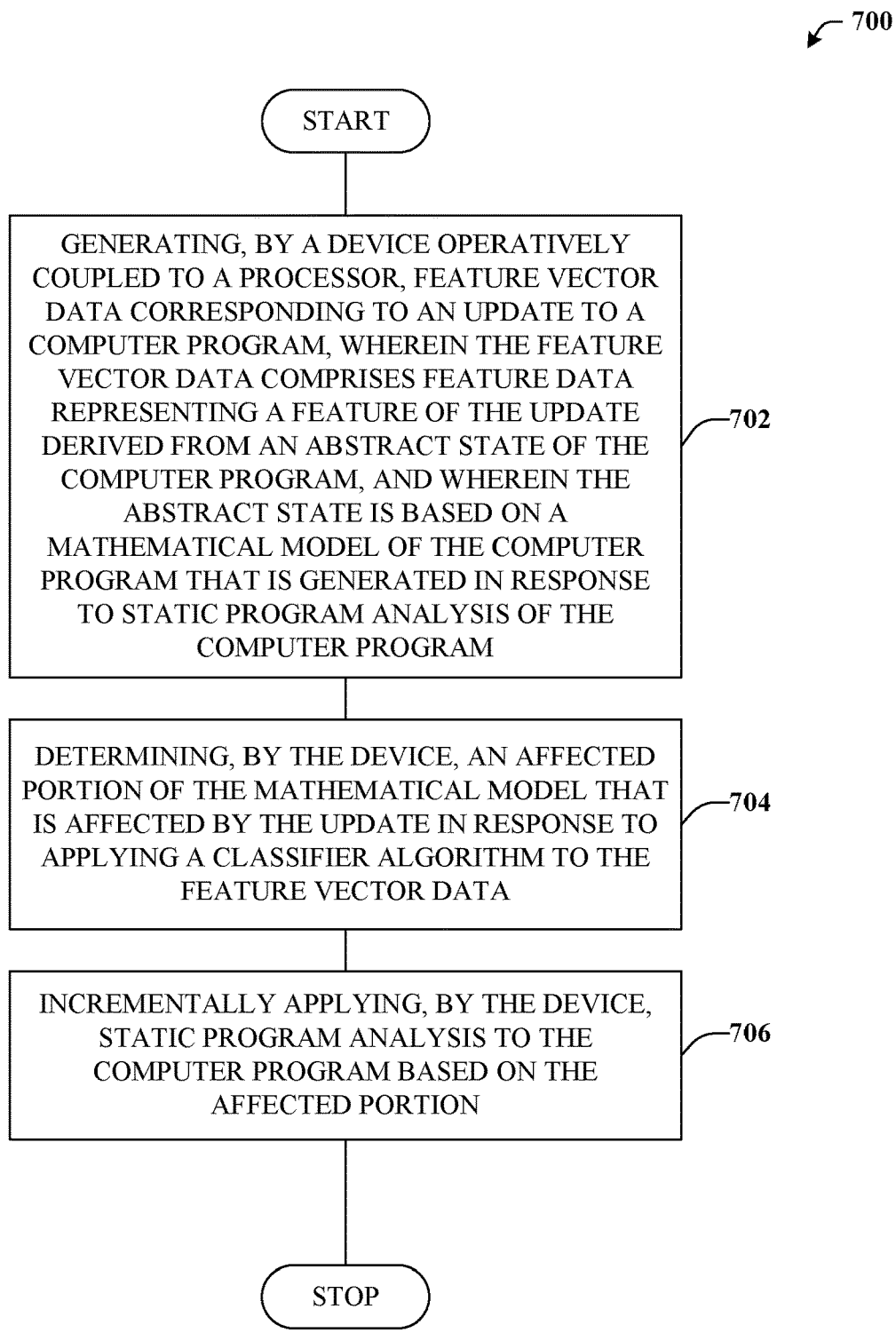
FIG. 7 illustrates a flow diagram of an example, non-limiting computer-implemented method that can facilitate incremental static program analysis based on machine learning techniques in accordance with one or more embodiments of the disclosed subject matter.
Figure 8:
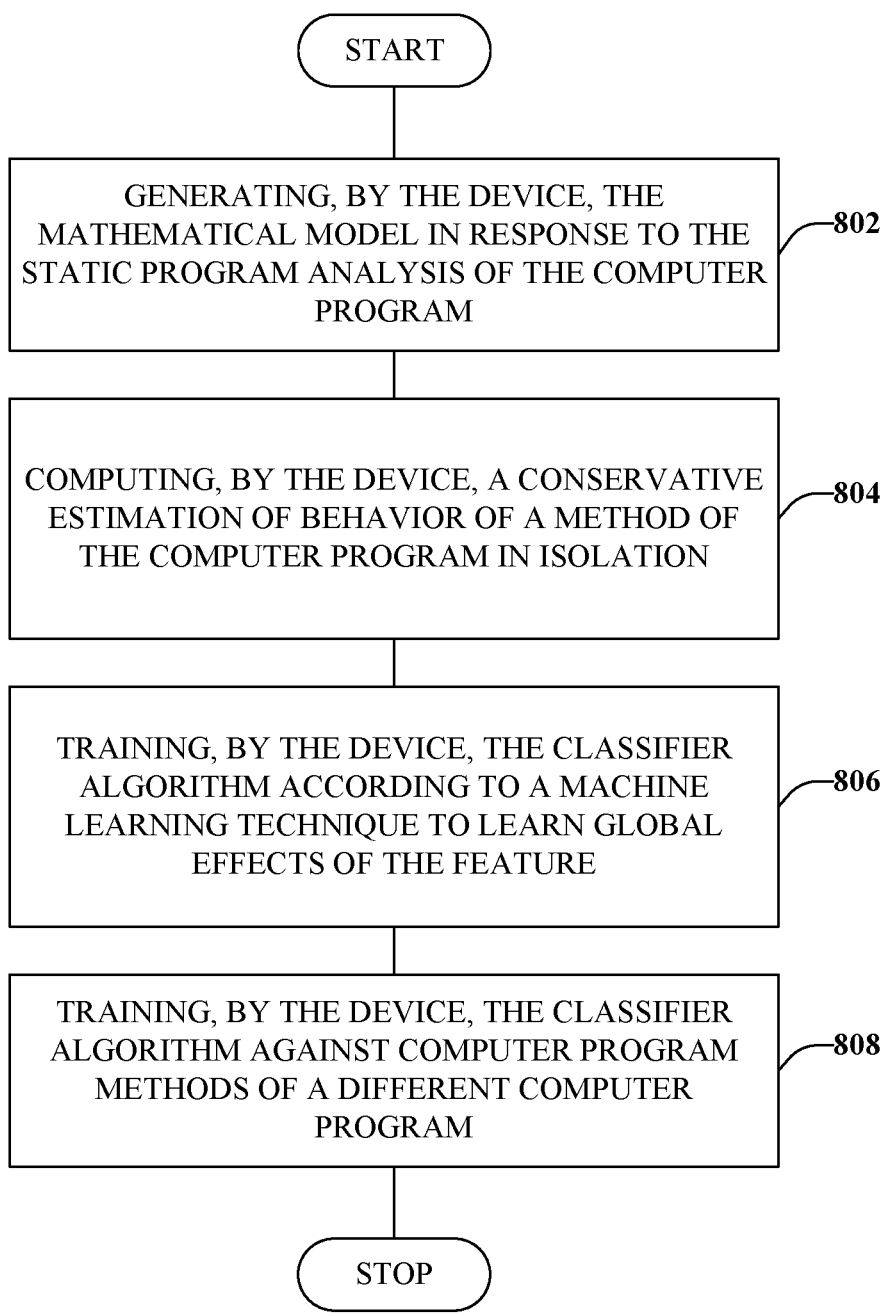
FIG. 8 illustrates a flow diagram of an example, non-limiting computer-implemented method that can provide for additional aspects or elements for facilitating incremental static program analysis based on machine learning techniques in accordance with one or more embodiments of the disclosed subject matter.
Figure 9:
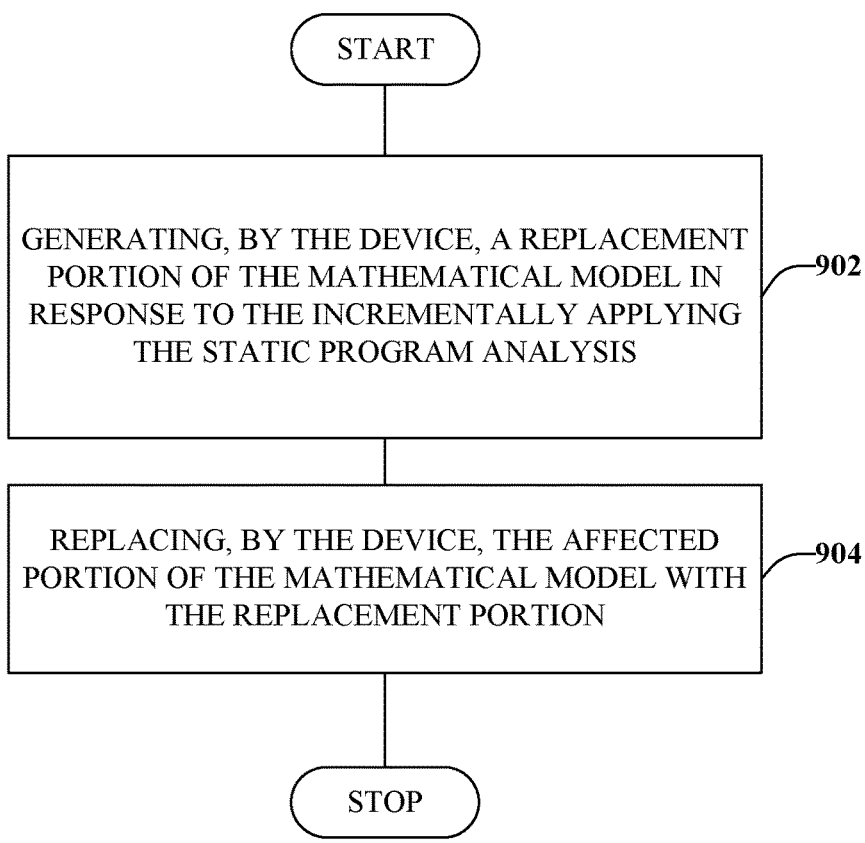
FIG. 9 illustrates a flow diagram of an example, non-limiting computer-implemented method that can replace the affected portion of the mathematical model with an incrementally generated replacement portion in accordance with one or more embodiments of the disclosed subject matter.

FIGS. 7, 8 and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 7 illustrates a flow diagram of an example, non-limiting computer-implemented method that can facilitate incremental static program analysis based on machine learning techniques in accordance with one or more embodiments of the disclosed subject matter. Repetitive description of like elements employed in other embodiments described herein is omitted for sake of brevity.

At reference numeral 702, a device (e.g., system 200) operatively coupled to a processor can generate feature vector data corresponding to an update to a computer program, wherein the feature vector data comprises feature data representing a feature of the update derived from an abstract state of the computer program, and wherein the abstract state is based on a mathematical model of the computer program that is generated in response to static program analysis of the computer program. The computer program can be representative of source code or object code. In some embodiments, the features can represent defined characteristics of the update.

At reference numeral 704, the device can determine an affected portion of the mathematical model that is affected by the update in response to applying a classifier algorithm to the feature vector data. For example, the classifier algorithm can analyze the features that represent the update to determine the affected portion. In some embodiments, the affected portion can represent a portion of the mathematical model to be incrementally updated instead of re-computing a new mathematical model from scratch.

At reference numeral 706, the device can incrementally apply static program analysis to the computer program based on the affected portion. In this regard, applying static program analysis only within the context of the affected portions can provide an incremental program analysis solution in some embodiments.

Turning now to FIG. 8, illustrated is a flow diagram of an example, non-limiting computer-implemented method that can provide for additional aspects or elements for facilitating incremental static program analysis based on machine learning techniques in accordance with one or more embodiments of the disclosed subject matter. Repetitive description of like elements employed in other embodiments described herein is omitted for sake of brevity.

At reference numeral 802, the device (e.g., system 200) can generate the mathematical model in response to the static program analysis of the computer program. At reference numeral 804, the mathematical model can be generated by computing, by the device, a conservative estimation of behavior of a method of the computer program in isolation and (in some embodiments, under worst-case assumptions). A conservative estimation of behavior under worst-case assumptions can refer to identifying all (or, in some embodiments, one or more) logically available paths of execution that can exist for the computer program, even if those execution paths are not possible or feasible during actual execution of the computer program. Thus, an abstract state of the computer program can represent a superset of all possible states the computer program can be in during execution. In this regard, in some embodiments, the mathematical model, generated according to static program analysis, can be employed to identify all potential errors or vulnerabilities (e.g., no false negatives), and may identify potential errors or vulnerabilities that result from a state that is not possible or feasible during execution the computer program (e.g., false positives).

At reference numeral 806, the device can train the classifier algorithm according to a machine learning technique to learn global effects of the feature. At reference numeral 808, the device can train the classifier algorithm against computer program methods of one or more different computer program(s). In some embodiments, training can identify relationships between certain features and associated effects or changes to the mathematical model.

Turning now to FIG. 9, illustrated is a flow diagram of an example, non-limiting computer-implemented method that can replace the affected portion of the mathematical model with an incrementally generated replacement portion in accordance with one or more embodiments of the disclosed subject matter. Repetitive description of like elements employed in other embodiments described herein is omitted for sake of brevity.

At reference numeral 902, the device (e.g., system 200) can generate a replacement portion of the mathematical model in response to the incrementally applying the static program analysis. At reference numeral 904, the device can replace the affected portion of the mathematical model with the replacement portion. In some embodiments, such can facilitate an incrementally updated mathematical model without fully re-calculating a new mathematical model.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
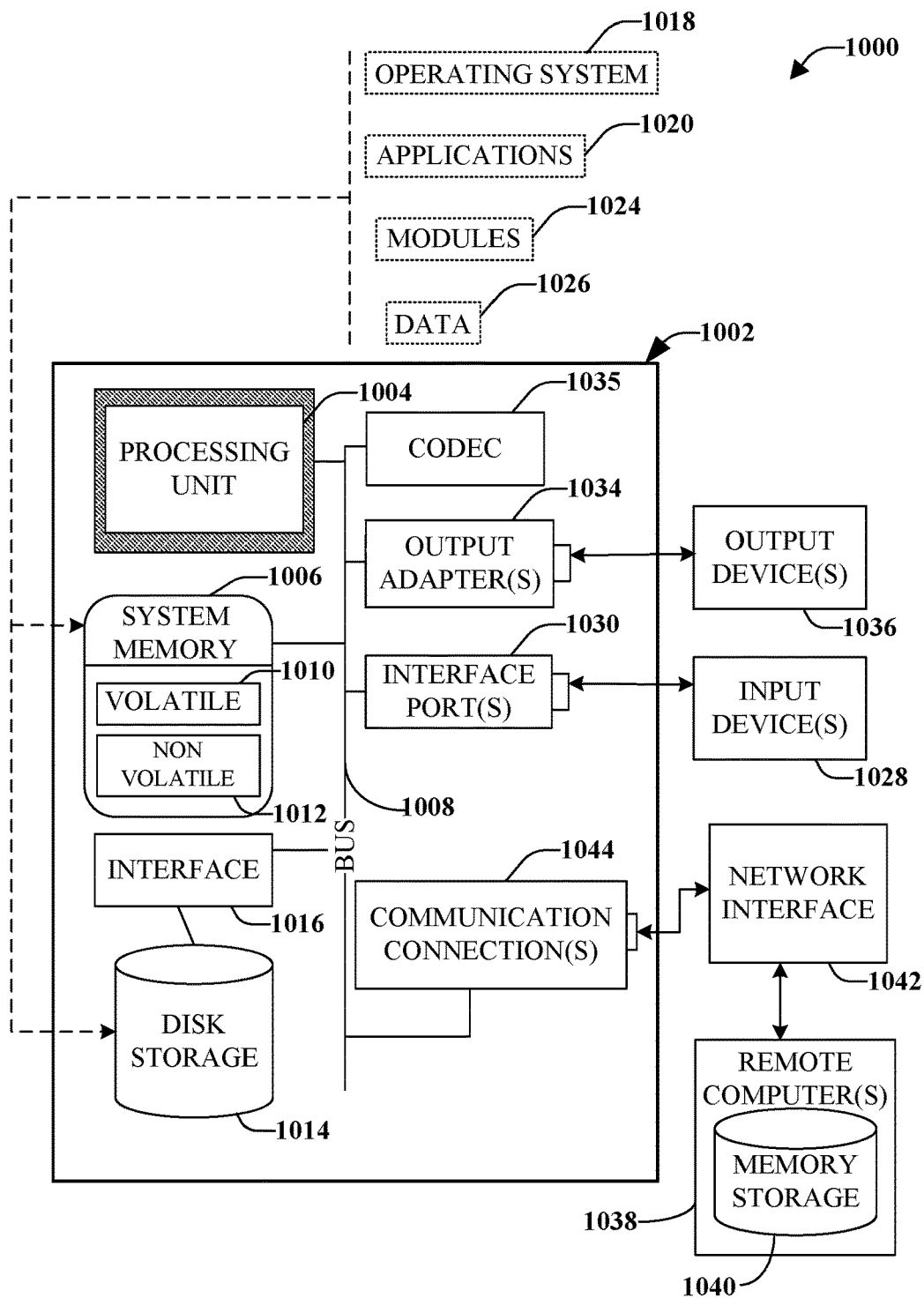
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that performs operations that comprise:
in response to an update to a computer program, generates feature vector data representing the update, wherein the feature vector data comprises feature data representing a feature of the update derived from an abstract state of the computer program, wherein the abstract state is based on a mathematical model of the computer program that is generated in response to static program analysis of the computer program;
employs machine learning to train a classifier algorithm to identify which portions of the mathematical model generated via static program analysis are no longer valid and tag the portions that are no longer valid, which are determined based on updates to the computer program and to identify relationships between defined features and associated effects on the mathematical model; and
employs the classifier algorithm to tag an affected portion of the mathematical model that is affected by the update to the computer program and incrementally re-computes the affected portion of the mathematical model without completely generating a new mathematical model, and wherein the portions that are no longer valid are distinct from the portions that are vulnerable yet valid.

2. The system of claim 1, wherein the static program analysis computes an estimation of behavior of a method of the computer program in isolation and under worst case assumptions, and wherein the updates comprise the update to the computer program and an update to the mathematical model.

3. The system of claim 1, wherein the feature data has a defined offset within the feature vector data.

4. The system of claim 3, wherein the feature relates to a heap access and is selected from a group consisting of an update to a variable of a method of the computer program, an accuracy of a type inference, a complexity of a path leading to the heap access, and a number of decisions influencing the heap access.

5. The system of claim 3, wherein the feature relates to a method call and is selected from a group consisting of an update to a receiver variable, a number of syntactic resolutions, an accuracy of a type inference, a complexity of a path leading to the method call, and a number of decisions influencing the method call.

6. The system of claim 1, wherein the processor also identifies the affected portion of the mathematical model based on the feature vector data.

7. The system of claim 1, wherein the processor also generates a replacement portion of the mathematical model that replaces the affected portion, and wherein the replacement portion facilitates usability of incremental static program analysis.

8. The system of claim 1, wherein the classifier algorithm is also trained via machine learning to learn global effects of the feature.

9. A computer-implemented method, comprising:
generating, by a device operatively coupled to a processor, feature vector data corresponding to an update to a computer program, wherein the feature vector data comprises feature data representing a feature of the update derived from an abstract state of the computer program, and wherein the abstract state is based on a mathematical model of the computer program that is generated in response to static program analysis of the computer program;
employing, by the device, machine learning to train a classifier algorithm to identify which portions of the mathematical model generated via static program analysis are no longer valid and tag the portions that are no longer valid, which are determined based on updates to the computer program and to identify relationships between defined features and associated effects on the mathematical model;
tagging, by the device, an affected portion of the mathematical model that is affected by the update to the computer program; and
incrementally re-computing the affected portion of the mathematical model without completely generating a new mathematical model, and wherein the portions that are no longer valid are distinct from the portions that are vulnerable yet valid.

10. The computer-implemented method of claim 9, wherein the generating the mathematical model comprises computing, by the device, an estimation of behavior of a method of the computer program in isolation.

11. The computer-implemented method of claim 9, further comprising training, by the device, the classifier algorithm via the machine learning to learn global effects of the feature.

12. The computer-implemented method of claim 11, wherein the training comprises training, by the device, the classifier algorithm against computer program methods of a different computer program.

13. The computer-implemented method of claim 9, further comprising replacing, by the device, the affected portion of the mathematical model with the replacement portion.

14. A computer program product for facilitating incremental static program analysis, the computer program product comprising a computer readable storage medium having program instructions embodied therewith, the program instructions executable by a processor to cause the processor to:
generate, by the processor, feature vector data corresponding to an update to a computer program, wherein the feature vector data comprises feature data representing a feature of the update derived from an abstract state of the computer program, wherein the abstract state is based on a mathematical model of the computer program that is generated in response to static program analysis of the computer program;
employ machine learning to train a classifier algorithm to identify which portions of the mathematical model generated via static program analysis is not valid and tag the portions that are no longer valid, which are determined based on updates to the to the computer program and to identify relationships between defined features and associated effects on the mathematical model; and
utilize, by the processor, the classifier algorithm to tag an affected portion of the mathematical model that is affected by the update to the computer program;
incrementally re-compute, by the processor, the affected portion of the mathematical model without completely generating a new mathematical model, and wherein the portions that are no longer valid are distinct from the portions that are vulnerable yet valid.

15. The computer program product of claim 14, wherein the program instructions are further executable by the processor to cause the processor to generate, by the processor, the mathematical model in response to the static program analysis of the computer program.

16. The computer program product of claim 15, wherein the mathematical model is generated based on an estimation of behavior of a method of the computer program in isolation.

17. The computer program product of claim 16, wherein the program instructions are further executable by the processor to cause the processor to train, by the processor, the classifier algorithm via the machine learning to learn global effects of the feature.

18. The computer program product of claim 17, wherein the classifier algorithm is also trained against computer program methods of a different computer program.

* * * * *